United States Patent [19]

Young

[11] Patent Number: 5,286,234
[45] Date of Patent: Feb. 15, 1994

[54] CHAIN TENSIONER APPARATUS

[75] Inventor: James D. Young, Chesaning, Mich.

[73] Assignee: Cloyes-Iwis Company L.P., Willoughby, Ohio

[21] Appl. No.: 919,648

[22] Filed: Jul. 27, 1992

[51] Int. Cl.⁵ .............................................. F16H 7/08
[52] U.S. Cl. ...................................... 474/111; 474/140
[58] Field of Search ..................... 474/111, 125, 140

[56] References Cited

U.S. PATENT DOCUMENTS

| | | | |
|---|---|---|---|
| 3,276,282 | 10/1966 | Duncan | 474/111 |
| 3,490,302 | 1/1970 | Turner et al. | 474/111 |
| 4,193,314 | 3/1980 | Horner et al. | 474/140 |
| 4,713,043 | 12/1987 | Biedermann | 474/111 |
| 4,921,472 | 5/1990 | Young | 474/140 |
| 5,045,032 | 9/1991 | Suzuki et al. | 474/140 |
| 5,055,088 | 10/1991 | Cradduck et al. | 474/140 |
| 5,184,983 | 2/1993 | Shimaya et al. | 474/140 X |

FOREIGN PATENT DOCUMENTS

| | | |
|---|---|---|
| 2431425 | of 0000 | Fed. Rep. of Germany . |
| 3049106 | of 0000 | Fed. Rep. of Germany . |
| 134055 | 8/1982 | Japan .................... 474/111 |

Primary Examiner—Ramon S. Britts
Assistant Examiner—Roger J. Schoeppel
Attorney, Agent, or Firm—Fay, Sharpe, Beall, Fagan, Minnich & McKee

[57] ABSTRACT

A chain tensioner apparatus which has a blade spring received laterally into a slot in the side of an elongated plastic shoe. A shoe mounting bracket carries the shoe and includes a side wall which overlies the slot to retain the blade spring in position. One end of the shoe is pivotally connected to the bracket, and the opposite end is retained in position and permitted to shift relative to the pivoted end by a retaining tab spaced outwardly of the side wall of the bracket.

15 Claims, 2 Drawing Sheets

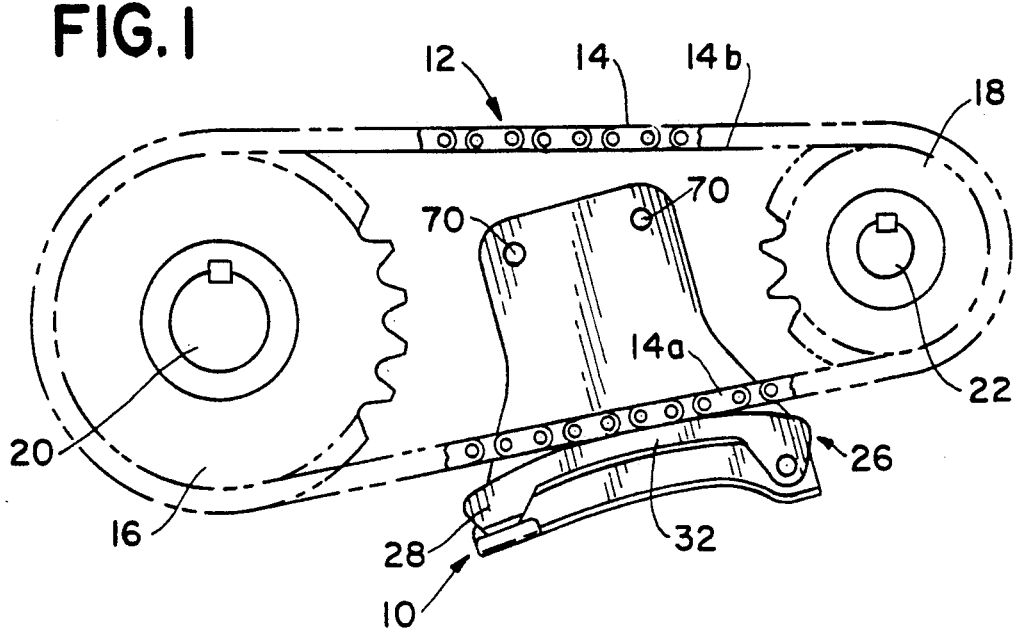
FIG.1
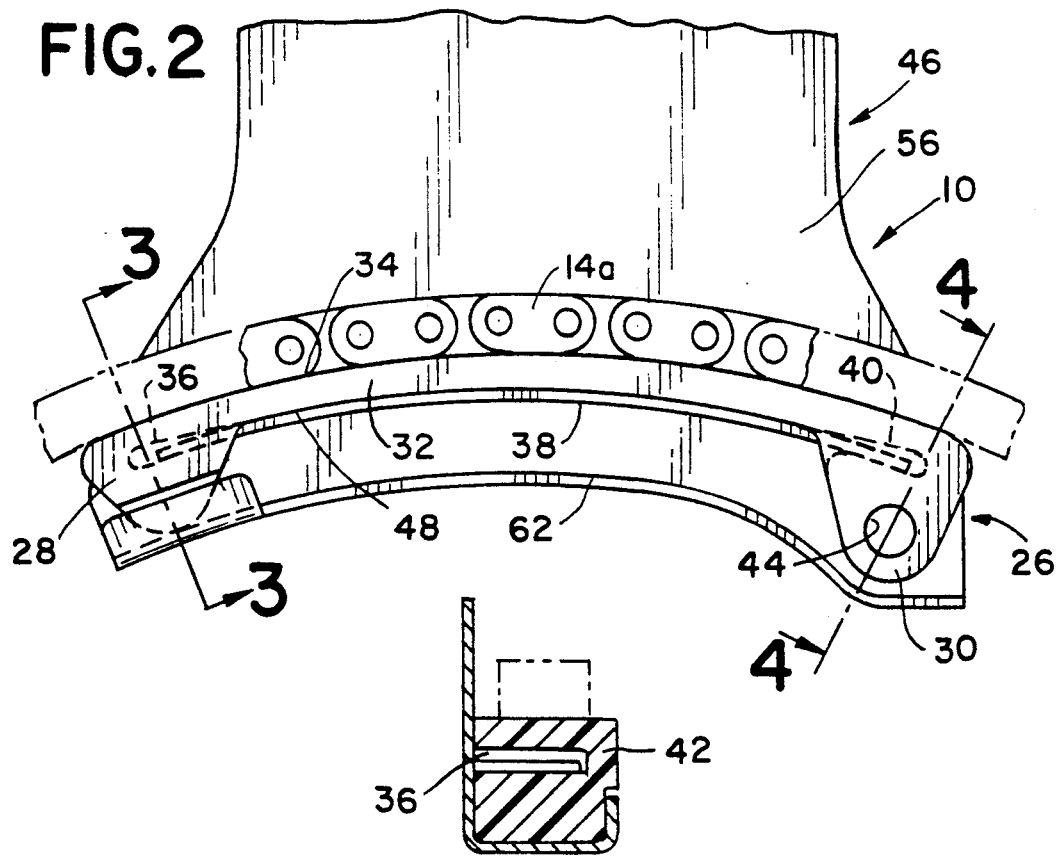
FIG.2
FIG.3

CHAIN TENSIONER APPARATUS

BACKGROUND OF THE INVENTION

The subject invention is directed toward the art of chain power drives and, more particularly, to a chain guide and tensioner apparatus useful in confined spaces for applying a tensioning force to a chain traveling therepast.

Several prior art patents show chain tensioner devices that include a chain engaging shoe member formed from a plastic material with a metal spring or bracket incorporated therein to provide the shoe with the necessary resiliency and rigidity while taking advantage of the plastics low friction and good wear characteristics. For example, my prior U.S. Pat. No. 4,921,472 discloses a chain tensioner wherein a blade spring is received in longitudinal passageways formed in a plastic shoe. The spring is retained in longitudinal position by internal shoulders in the passageways. Lateral positioning and retention is achieved by cooperation between longitudinal slots in the ends of the spring and central internal walls in the passageways.

One of the disadvantages present with my prior design, as well as other prior art designs, is that the necessary slots, holes, and the like formed in the spring for retention purposes weaken the spring and require increasing its overall dimensions to achieve the tensioning force required. Additionally, the manufacturing cost of the springs can increase significantly because of added processing steps needed to form the slots and openings. Likewise, the molding of the plastic shoe can require somewhat complex molds because of the internal retaining walls and tabs.

The above discussed factors can result in a chain tensioner that is somewhat more complex and expensive than is desirable.

SUMMARY OF THE INVENTION

The subject invention provides a chain tensioner apparatus which overcomes the above-discussed problems and is greatly simplified in construction. Chain tensioners formed in accordance with the invention are significantly simpler and less expensive than the prior designs.

In accordance with the subject invention, a chain tensioner is provided which comprises an elongated shoe formed of a resinous plastic material and having first and second longitudinally spaced enlarged ends joined by a relatively narrow, resilient central body section. The shoe has a first exterior wall surface which extends the length thereof and is adapted to engage the chain to be tightened. Narrow slots extend laterally into the enlarged ends generally parallel to the first exterior wall surface. A blade spring having a length nearly as great as the shoe and terminating in first and second ends is received in the slot to extend longitudinally of the shoe generally parallel to the first exterior wall. A rigid metal support bracket is provided for mounting the shoe adjacent the chain to be tightened. The bracket has a side wall engaging a side of the shoe and overlying the slots for retaining the blade spring in the slots.

In accordance with a more limited aspect of the invention, the bracket includes a tab portion which is spaced outwardly from the side wall for engaging the shoe and retaining it in engagement with the side wall while permitting free flexure and pivoting movement of the shoe.

With the subject design, the slots can be simple open slots which extend laterally into the body of the shoe and terminate in bottom walls which are relatively thin. The spring blade can be a simple rectangular spring section with no end slots or holes for mounting since the bracket itself retains the spring in position in the slots.

Preferably, the shoe has its first end pivotally connected to the bracket, and the second end retained in position by the bracket tab portion. This allows the shoe to have free flexure and maintain its position on the bracket. Additionally, it should be understood that the design allows the blade spring to have a width nearly as great as the shoe since the slots into which it is mounted can extend nearly completely through the shoe.

The design is thus extremely simple, and the blade and the shoe are both relatively easy to manufacture and do not require special molds, dies, or additional stamping steps.

As can be seen from the foregoing, a primary object of the invention is to provide an extremely simple chain tensioning apparatus which overcomes problems of the prior designs.

A further object of the invention is the provision of a chain tensioning device wherein the blade spring can be a simple rectangular shape without slots or through openings.

A further object of the invention is the provision of a chain tensioning design wherein the bracket which carries the tensioning shoe serves to maintain the blade spring in position in the shoe.

BRIEF DESCRIPTION OF THE DRAWINGS

The above and other objects and advantages will become apparent from the following description when read in conjunction with the accompanying drawings wherein:

FIG. 1 is a profile view of a chain drive mechanism having a tensioning apparatus formed in accordance with the invention;

FIG. 2 is a greatly enlarged profile view of the tensioning shoe and mounting bracket of the FIG. 1 embodiment;

FIGS. 3 and 4 are cross-sectional views taken on lines 3—3 and 4—4, respectively, of FIG. 2; and, FIG. 5 is an exploded pictorial view of the various components of the tensioning apparatus shown in FIG. 2.

DETAILED DESCRIPTION OF THE PREFERRED EMBODIMENT

Figure 5:
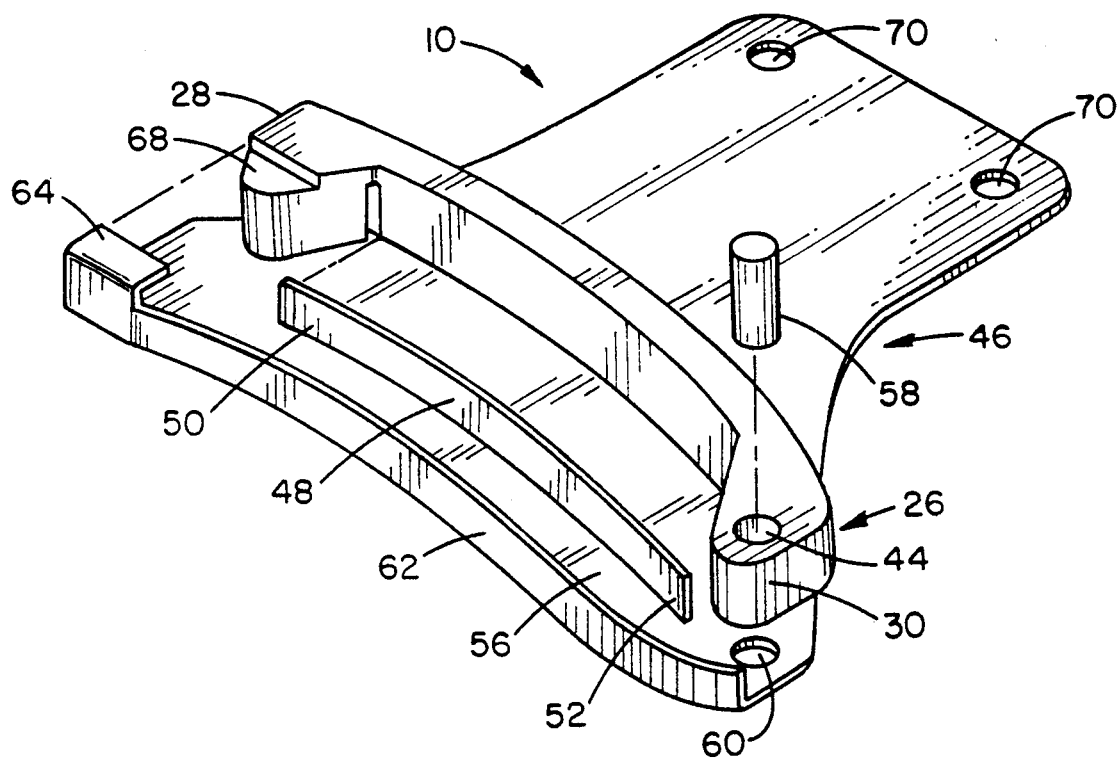

Referring more particularly to the drawings wherein the showings are for the purpose of illustrating a preferred embodiment of the invention only, and not for the purpose of limiting same, FIG. 1 shows the overall arrangement of an improved chain tensioning apparatus 10 associated with a conventional chain drive of the type often used on internal combustion engines for timing purposes. In the subject embodiment, the chain drive assembly 12 is illustrated as comprising a chain element 14 connected to drive between a pair of spaced sprockets 16 and 18 respectively mounted on shafts 20 and 22. The run 14a of the chain 14 is engaged by the tensioning assembly 10 in a conventional manner which will subsequently be described in greater detail. For present purposes, however, attention is directed to FIGS. 2 through 5 which illustrate in greater detail the various construction and design features of the subject invention.

As illustrated therein, the tensioning assembly 10 comprises an elongated shoe member 26 which is formed of a suitable resinous plastic material, such as heat stabilized nylon or other engineering plastic, which has the necessary rigidity and load-carrying capabilities under elevated the temperatures that might be encountered in an engine environment.

In the embodiment illustrated, the shoe 26 has enlarged end portions 28 and 30 that are joined by a relatively thin and flexible central section 32. A first exterior guide surface 34 extends the length of the lateral side of the body between the first end 28 and the second end 30. Surface 34 is relatively flat and is adapted to engage and apply the necessary tension forces to the chain run 14a. The surface 34 is flat in its width direction, but is gently curved throughout the length as illustrated in FIG. 2.

The enlarged first end 28 of the shoe 26 is provided with a laterally inwardly extending, relatively narrow slot 36 as shown. Slot 36 extends inwardly from one lateral side nearly completely through the width dimension of the end portion 28 and is in alignment with a second exterior surface 38 formed on the central body section 32. It should be noted that exterior surface 38 is generally parallel to the first exterior guide surface 34.

The second enlarged end portion 30 is likewise provided with a relatively narrow, laterally inwardly extending slot 40 which is also aligned with the surface 38 and the opposite end slot 36. Slot 40, like slot 36, extends inwardly substantially the full width of the shoe 26. As can be seen from FIGS. 3 and 4, the slots 36 and 40 terminate adjacent a bottom wall 42 which is relatively thin.

Figure 4:
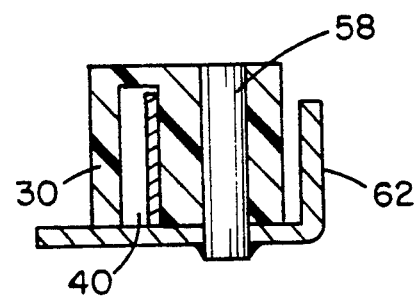

As best illustrated in FIGS. 2 and 4, the enlarged second end 30 of the shoe 26 also includes a transversely extending through opening 44 which provides means for mounting the shoe to an associated mounting bracket 46. The actual relationship between the shoe and the bracket 46 will subsequently be described in some detail; however for the present, it should be noted that the assembly further includes a blade spring member 48 which is of a generally rectangular configuration (see FIG. 5) with a length only slightly less than the overall length of the shoe 26. The width of the blade spring 48 is only slightly less than the total width of the shoe 26. The spring 48 functions to provide the,. necessary longitudinal flexibility and lateral rigidity required for the shoe 26. The spring 28 of the subject embodiment is received laterally into the shoe 26 with its respective first and second ends 50, 52 received in the slots 36, 40 of the first and second ends 28, 30 of the shoe 26. The relative sizes of the slots 36 and 40 compared to the spring 48 are such as to allow the spring to completely fill the slots in their lateral depth direction as illustrated in FIGS. 3 and 4. The spring is thus basically a full width spring with no slots or mounting openings formed therein. It can have, as shown, a simple rectangular configuration of uniform width throughout its length. Additionally, as can be seen, the slots 36#40 are simple slots with no complex internal shoulders, walls, tabs, or the like.

Spring 48 is retained in position in the shoe 26 by the previously-mentioned mounting bracket 46. As shown, the mounting bracket 46 includes a lateral side wall 56 that overlies the open side of the slots 36, 40. The shoe 26 is retained in position on the bracket 46 by having its second end 30 pivotally connected to the bracket 46 by a transversely extending pin 58 which passes through opening 44 into connection in a suitable opening 60 formed as shown on bracket 46.

A suitable strengthening flange 62 extends across the entire width of the bracket 46 closely adjacent the shoe 26. At the left-hand end of flange 62 (as viewed in FIG. 5), there is a laterally extending retaining tab means 64. The retaining tab means 64 is spaced outwardly from the side wall 56 a distance such that it engages the upper surface 68 of the enlarged end 28 of shoe 26. The tab retaining means 64 thus acts to retain the shoe 26 in proper lateral relationship with the bracket 46 while permitting limited pivoting movement about pin 58. Additionally, the shoe 26 can flex, and the distance between the enlarged ends 28 and 30 change as necessary during the lateral flexure of the shoe 26.

As can be appreciated, the bracket 46 can be mounted relative to the chain drive in any convenient manner. In the subject embodiment, it is mounted by being carried on suitable bolts or studs 70 connected to an associated support structure, not shown.

The design described has numerous advantages previously discussed. It is important to note, however, that there are no special requirements to maintain the spring in its full operative position within the shoe 26. This is accomplished simply by the relationship between the shoe and the mounting bracket, and the spring is thus firmly held in position, and both the spring and the associated shoe are extremely simple, easily manufactured elements. Additionally, the loading of the spring into the shoe can take place simply and without special tools or mounting or assembly jigs and fixtures.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A chain tensioner comprising:
   an elongated shoe having first and second longitudinally spaced enlarged ends joined by a central body section, the shoe being formed of a synthetic plastic and having a first exterior wall surface extending the length thereof adapted to engage the chain to be tensioned, narrow slots extending laterally into the enlarged ends generally parallel to the first exterior wall surface;
   a blade spring having a length nearly as great as the shoe and terminating in first and second ends received respectively in the slots in the first and second ends of the shoe to extend longitudinally of the shoe generally parallel to the first exterior wall; and,
   a rigid metal support bracket for mounting the shoe adjacent the chain to be tightened, the bracket having a side wall engaging a side of the shoe and overlying the slots for retaining the blade spring in the slots.

2. The chain tensioner as defined in claim 1 wherein the bracket includes a tab portion spaced outwardly from the side wall for retaining the shoe in engagement with the side wall while permitting flexure of the shoe.

3. The chain tensioner as defined in claim 1 wherein the shoe has its first end pivotally connected to the bracket.

4. The chain tensioner as defined in claim 3 wherein the shoe has its second end retained in position adjacent the side wall of the bracket by a retaining means which allows longitudinal shifting of the second end relative to the first end.

5. The chain tensioner as defined in claim 4 wherein the retaining means comprises a tab-like extension on the bracket spaced from the side wall and engaging the shoe.

6. The chain tensioner as defined in claim 1 wherein the blade spring has a generally rectangular configuration.

7. The chain tensioner as defined in claim 1 wherein the narrow slots extend into the first and second ends to a depth nearly equal to the width of the first exterior wall surface.

8. The chain tensioner as defined in claim 1 wherein the central body section of the shoe has a second exterior surface generally parallel to the first exterior surface, the second exterior surface aligned with the slots.

9. The chain tensioner as defined in claim 8 wherein the blade spring has a middle portion between the first and second ends, the middle portion engaging the second exterior surface of the shoe.

10. A chain tensioner comprising:
an elongated shoe formed of a resinous plastic having first and second longitudinally spaced enlarged ends joined by a central body section, the shoe having a first exterior wall surface extending the length thereof adapted to engage the chain to be tensioned, narrow slots extending laterally into the enlarged ends generally parallel to the first exterior wall surface;
a generally rectangular blade spring having a length nearly as great as the shoe and terminating in first and second ends received respectively in the slots in the first and second ends of the shoe to extend longitudinally of the shoe generally parallel to the first exterior wall; and
a rigid metal support bracket for mounting the shoe adjacent the chain to be tightened, the bracket having a side wall engaging a side of the shoe and overlying the slots for retaining the blade spring in the slots, and retaining means for retaining the shoe on the bracket while permitting free flexure of the shoe relative thereto.

11. The chain tensioner as defined in claim 10 wherein the retaining means includes a tab portion spaced outwardly from the side wall.

12. The chain tensioner as defined in claim 10 wherein the shoe has its first end pivotally connected to the bracket.

13. A chain tensioner comprising:
an elongated shoe having first and second longitudinally spaced enlarged ends joined by a central body section, the shoe being formed of a synthetic plastic and having a first exterior wall surface extending the length thereof adapted to engage the chain to be tensioned, narrow slots extending laterally into the enlarged ends generally parallel to the first exterior wall surface;
a blade spring having a length nearly as great as the shoe and terminating in first and second ends received respectively in the slots in the first and second ends of the shoe to extend longitudinally of the shoe generally parallel to the first exterior wall;
a rigid metal support bracket for mounting the shoe adjacent the chain to be tightened; and,
means adjacent a side of the shoe for overlying the blade spring on the side of the slots for retaining the blade spring in the slots.

14. The chain tensioner as defined in claim 13 wherein the said means adjacent a side of the shoe is a portion of the support bracket.

15. The chain tensioner as defined in claim 13 wherein the said means adjacent a side of the shoe comprises a wall of the support bracket.

* * * * *